United States Patent
Sahara et al.

(10) Patent No.: US 12,440,505 B2
(45) Date of Patent: Oct. 14, 2025

(54) METHOD OF TREATING CANCER

(71) Applicants: M.T.3, Inc., Tokyo (JP); NIHON UNIVERSITY, Tokyo (JP); SCHOOL CORPORATION, AZABU VETERINARY MEDICINE EDUCATIONAL INSTITUTION, Sagamihara (JP)

(72) Inventors: Hiroeki Sahara, Sagamihara (JP); Tomohiro Nakayama, Tokyo (JP); Takuya Maruo, Sagamihara (JP)

(73) Assignees: M.T.3, INC., Tokyo (JP); NIHON UNIVERSITY, Tokyo (JP); SCHOOL CORPORATION, AZABU VETERINARY MEDICINE EDUCATIONAL INSTITUTION, Sagamihara (JP)

( * ) Notice: Subject to any disclaimer, the term of this patent is extended or adjusted under 35 U.S.C. 154(b) by 835 days.

(21) Appl. No.: 17/465,921

(22) Filed: Sep. 3, 2021

(65) Prior Publication Data
US 2021/0393660 A1 Dec. 23, 2021

Related U.S. Application Data

(63) Continuation of application No. PCT/JP2019/041730, filed on Oct. 24, 2019.

(30) Foreign Application Priority Data

Mar. 5, 2019 (JP) ................... 2019-039749

(51) Int. Cl.
*A61K 31/7032* (2006.01)
*A61N 5/10* (2006.01)
*A61P 35/00* (2006.01)

(52) U.S. Cl.
CPC ............ *A61K 31/7032* (2013.01); *A61N 5/10* (2013.01); *A61P 35/00* (2018.01); *A61N 2005/1098* (2013.01)

(58) Field of Classification Search
None
See application file for complete search history.

(56) References Cited

U.S. PATENT DOCUMENTS

| 7,973,145 B2 * | 7/2011 | Ohta ................. A61K 41/0038 536/4.1 |
| 2007/0219145 A1 | 9/2007 | Sakimoto et al. |
| 2009/0209475 A1 | 8/2009 | Ohta et al. |
| 2010/0202971 A1 | 8/2010 | Ohta et al. |

FOREIGN PATENT DOCUMENTS

| EP | 2130834 A1 | 12/2009 |
| JP | 2002536341 A | 10/2002 |
| JP | 2007302609 A | 11/2007 |
| JP | 2016150905 A | 8/2016 |
| WO | 0045845 A2 | 8/2000 |
| WO | 2006001374 A1 | 1/2006 |
| WO | 2009014101 A1 | 1/2009 |
| WO | 2010082634 A1 | 7/2010 |

OTHER PUBLICATIONS

Sawada et al., International Journal of Urology, Jun. 2015, vol. 22, issue 6, pp. 590-595. (Year: 2015).*
Takakusagi et al., Cancer Research, Dec. 2018, vol. 78, No. 24, pp. 6828-683. (Year: 2018).*
Sawada et al., International Journal of Urology, Jun. 2015, vol. 22(6), pp. 590-595. (Year: 2015).*
Takakusagi et al., Cancer Research, Dec. 2018, vol. 78(24), pp. 6828-6837. (Year: 2018).*
International Search Report (PCT/ISA/210) with translation and Written Opinion (PCT/ISA/237) mailed on Jan. 28, 2020, by the Japan Patent Office as the International Searching Authority for International Application No. PCT/JP2019/041730. (13 pages).
Iwamoto et al., "Inhibition of hypoxia-inducible factor via upregulation of von Hippel-Lindau protein induces "angiogenic switch off" in a hepatoma mouse model", Molecular Therapy—Oncolytics, Jan. 1, 2015, vol. 2, Article No. 15020.
Izaguirre-Carbonell et al., "Novel anticancer agent, SQAP, binds to focal adhesion kinase and modulates its activity", Scientific Reports, Oct. 12, 2015, vol. 5, Article No. 15136.
Sawada et al., "Sulfoquinovosylacylpropanediol is a novel potent radiosensitizer in prostate cancer", International Journal of Urology, Jun. 1, 2015, vol. 22, issue 6, pp. 590-595.
Takakusagi et al., "A Multimodal Molecular Imaging Study Evaluates Pharmacological Alteration of the Tumor Microenvironment to Improve Radiation Response", Cancer Research, Dec. 15, 2018, vol. 78, No. 2 4, pp. 6828-6837.
Extended European Search Report dated Mar. 10, 2022, issued in corresponding European Application No. 19918427.6. (9 pages).
Ohta et al., "Remodeling of the Tumor Microenvironment by Combined Treatment With a Novel Radiosensitizer, Alpha-Sulfoquinovosylmonoacylglycerol (Alpha-SqQMG) and X-Irradiation", Anticancer Research, vol. 30, No. 11, Nov. 2010, pp. 4397-4404, XP002805786.
Sakimoto et al., "Alpha-Sulfoquinovosylmonoacylglycerol is a Novel Potent Radiosensitizer Targeting Tumor Angiogenesis", Cancer Research, vol. 66, No. 4, Feb. 2006, pp. 2287-2295, XP002805785.

* cited by examiner

*Primary Examiner* — Traviss C McIntosh, III
(74) *Attorney, Agent, or Firm* — BUCHANAN INGERSOLL & ROONEY PC

(57) ABSTRACT

There is provided with a method of treating cancer. A set of administration of a compound represented by General Formula (I) or a pharmaceutically acceptable salt thereof to a patient, at a dose such that 8 mg/kg or less of the compound represented by General Formula (I) is administered, and irradiation to the patient immediately following the administration is repeated. A total dosage of the irradiation to a cancer is 10 Gy or more.

9 Claims, No Drawings

METHOD OF TREATING CANCER

CROSS-REFERENCE TO RELATED APPLICATION(S)

This application is a continuation of International Patent Application No. PCT/JP2019/041730 filed on Oct. 24, 2019, which claims priority to and the benefit of Japanese Patent Application No. 2019-039749 filed on Mar. 5, 2019, the entire disclosures of which are incorporated herein by reference.

BACKGROUND OF THE INVENTION

Field of the Invention

The present invention relates to a radiosensitizing agent for cancer treatment.

Description of the Related Art

As the life spans of humans and pet animals such as dogs and cats have been extended due to advances in medical treatment, the rate of dying from cancer has been increasing. A radiation therapy as well as an operative therapy and a chemotherapy is employed as a method for cancer treatment, and there is always a demand for advances in these treatment methods.

A technique for administering a radiosensitizing agent to a patient has been studied as a technique for improving the therapeutic effect of radiation treatment. Known examples of the radiosensitizing agent include 2-nitroimidazol derivatives (PTL1: Japanese Patent Laid-Open No. 2007-302609), which improve the radiation sensitivity of hypoxic cells, and 5-iododeoxyuridine (PTL2: Japanese Patent Laid-Open No. 2002-536341), which improves radiation sensitivity through incorporation into DNA. In recent years, a sulfoquinovosylacylpropanediol (PTL3: International Publication No. WO2009/14101) has also been reported as a novel radiosensitizing agent. PTL3 discloses that angiogenesis was inhibited in an in-vitro test by using αSQAP C10:0, αSQAP C14:0, αSQAP C18:0, αSQAP C22:0, βSQAP C18:0, and βSQAP C18:1 with radiation, and that an increase in tumor volume was suppressed by using αSQAP C18:0 with radiation in a mouse to which human esophageal squamous cell carcinoma or human colon adenocarcinoma was transplanted. It should be noted that, in the term "αSQAP Cm:n", "α" represents an α anomer, "β" represents a β anomer, and "Cm:n" means that the number of carbon atoms and the number of double bonds in an acyl residue of SQAP are "m" and "n", respectively.

SUMMARY OF THE INVENTION

According to an embodiment of the present invention, a method of treating cancer comprises repeating a set of administration of a compound represented by General Formula (I) or a pharmaceutically acceptable salt thereof to a patient, at a dose such that 8 mg/kg or less of the compound represented by General Formula (I) is administered, and irradiation to the patient immediately following the administration:

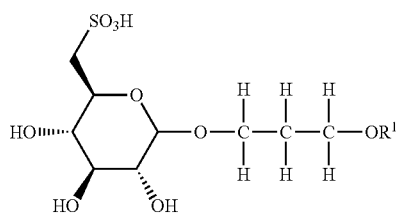

where $R^1$ is an acyl residue from fatty acid,
wherein a total dosage of the irradiation to a cancer is 10 Gy or more.

Further features of the present invention will become apparent from the following description of exemplary embodiments (with reference to the attached drawings).

DESCRIPTION OF THE EMBODIMENTS

There is a demand for an improvement in outcomes of radiation treatment, but when a sulfoquinovosylacylpropanediol was administered to a mouse to which human carcinoma cells were transplanted in the method disclosed in PTL3, for example, the rate of increase in tumor volume could be reduced, but an increase in tumor volume could not be stopped.

An embodiment of the present invention can improve the effects of radiation treatment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

A radiosensitizing agent according to one embodiment of the present invention is a radiosensitizing agent for cancer treatment and contains a compound represented by General Formula (I) or a pharmaceutically acceptable salt thereof. In this specification, a compound represented by Formula (I) or a pharmaceutically acceptable salt thereof is referred to as a sulfoquinovosylacylpropanediol.

[Chemical Formula 2]

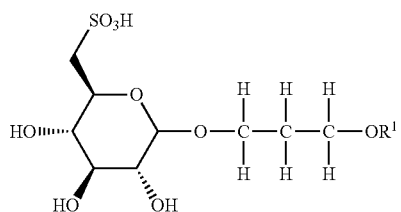

In Formula (I), $R^1$ is an acyl residue from fatty acid. The acyl residue from fatty acid corresponds to a residue obtained by removing OH from a carboxyl group of a fatty acid. There is no particular limitation on the type of fatty acid, and a linear or branched, saturated or unsaturated fatty acid may be employed. Also, there is no particular limitation on the number of carbon atoms in the fatty acid, and it is sufficient that the number of carbon atoms is 1 or more, but the number of carbon atoms is preferably 5 or more (medium-chain or longer fatty acids), more preferably 10 or more, even more preferably 12 or more (long-chain fatty acids), and even more preferably 16 or more. On the other hand, the number of carbon atoms is preferably 26 or less, more preferably 22 or less, and even more preferably 20 or less. The fatty acid is preferably a linear fatty acid, and more preferably a linear saturated fatty acid.

Examples of the fatty acid include caprylic acid, capric acid, lauric acid, myristic acid, palmitic acid, palmitoleic acid, stearic acid, oleic acid, vaccenic acid, linoleic acid, linolenic acid, eleostearic acid, arachidic acid, mead acid, arachidonic acid, behenic acid, lignoceric acid, nervonic acid, and cerotic acid.

There is no particular limitation on the steric arrangement of a propanediol moiety (—$OCH_2CH_2CH_2OR^1$) on a quinovose ring. That is, the sulfoquinovosylacylpropanediol may be an α anomer (the sulfomethyl group and the propanediol moiety are arranged in a trans conformation), a β anomer (the sulfomethyl group and the propanediol moiety are arranged in a cis conformation), or a mixture of an α anomer and a β anomer. The sulfoquinovosylacylpropanediol is preferably an α anomer. It should be noted that the quinovose ring may have a chair conformation or boat conformation, or may be a mixture of a chair-conformation type and a boat-conformation type.

The pharmaceutically acceptable salt of the compound represented by Formula (I) refers to a salt that can be administered to a patient. That is, the compound represented by Formula (I) may form a salt with a positive ion, and, for example, the sulfo group of the compound represented by Formula (I) may include a positive ion instead of a hydrogen ion. In this case, the sulfo group of the compound represented by Formula (I) is represented as —$SO_2A$, where A represents a positive ion.

There is no particular limitation on the type of pharmaceutically acceptable salt. For example, the pharmaceutically acceptable salt may be a metal salt with a metal ion or an organic salt with an organic positive ion. Examples of the pharmaceutically acceptable salt of the compound represented by Formula (I) include salts with a monovalent positive ion such as a sodium salt and a potassium salt, and salts with a divalent positive ion such as a calcium salt and a magnesium salt.

It is needless to say that the present invention also encompasses prodrugs that form a compound represented by Formula (I) or a pharmaceutically acceptable salt thereof in a formulation, or when a formulation is diluted for administration, or in the body of a patient. Examples of such prodrugs include esters produced by the formation of a bond between a hydroxyl group linked to a quinovose ring and a carboxylic acid. It is needless to say that the present invention also encompasses hydrates of a compound represented by Formula (I) or a pharmaceutically acceptable salt thereof.

The sulfoquinovosylacylpropanediol can be manufactured in accordance with the method disclosed in International Publication No. WO2009/14101, for example.

The radiosensitizing agent according to one embodiment of the present invention contains an effective amount of the sulfoquinovosylacylpropanediol as an active component. The radiosensitizing agent according to one embodiment of the present invention may contain two or more types of sulfoquinovosylacylpropanediols. For example, the radiosensitizing agent may contain two or more types of sulfoquinovosylacylpropanediols that are salts different from each other, or two or more types of sulfoquinovosylacylpropanediols that are different from each other in the substituent $R^1$.

Furthermore, the radiosensitizing agent according to one embodiment of the present invention may contain components other than the sulfoquinovosylacylpropanediol. Examples of such components include other radiosensitizing agents, anti-tumor agents, and other substances having pharmacological activity. In addition, other examples of such components include substances having no pharmacological activity such as additives, stabilizers, vehicles, and diluents.

Hereinafter, use of the radiosensitizing agent containing the sulfoquinovosylacylpropanediol and a method for cancer treatment in which this radiosensitizing agent is used will be described. The sulfoquinovosylacylpropanediol can be used as a radiosensitizing agent for cancer treatment. The radiosensitizing agent refers to an agent that is administered to a patient when the patient undergoes radiation treatment and that improves the effects of the radiation treatment. In the radiation treatment, cancer is irradiated with radiation for the purpose of reducing the size of the cancer or eliminating the cancer. Specific examples of the treatment method will be described later.

There is no particular limitation on the type of animal (patient) to be treated. Examples of the animal to be treated include mammals such as humans, dogs, cats, and horses. In one embodiment, the animal to be treated is a dog or cat from the viewpoint of obtaining higher efficacy. That is, the radiosensitizing agent according to one embodiment is a radiosensitizing agent for cancer treatment that contains a compound represented by General Formula (I) or a pharmaceutically acceptable salt thereof and that is to be administered to a dog or cat. Radiation treatment in which the radiosensitizing agent according to one embodiment is used exhibits a therapeutic effect of reducing the size of cancer developed in the body of a patient or eliminating the cancer.

There is no particular limitation on the type of cancer to be treated. Examples of the type of cancer include neurogenic tumors such as brain tumor, carcinomas such as squamous cell carcinoma and adenocarcinoma (e.g., head and neck carcinoma, skin carcinoma, esophageal carcinoma, thyroid carcinoma, gastric carcinoma, lung carcinoma, gallbladder carcinoma, biliary tract carcinoma, pancreatic carcinoma, liver carcinoma, prostate carcinoma, uterine carcinoma, ovarian carcinoma, breast carcinoma, renal carcinoma, bladder carcinoma, and large bowel carcinoma), melanoma, bone/soft tissue tumors, lymphoma, leukemia, and myeloma.

In one embodiment, the type of cancer is skin carcinoma or blood cancer, particularly melanoma or lymphoma, from the viewpoint of obtaining higher efficacy. In another embodiment, the type of cancer is squamous cell carcinoma or adenocarcinoma from the viewpoint of obtaining higher efficacy. In yet another embodiment, the type of cancer is intraoral tumor or intranasal tumor from the viewpoint of obtaining higher efficacy.

In one embodiment, the radiosensitizing agent is used to administer the compound represented by General Formula (I) to a patient at a dosage of 8 mg/kg or less per dose. That is, the radiosensitizing agent according to one embodiment is a radiosensitizing agent for cancer treatment that contains a compound represented by General Formula (I) or a pharmaceutically acceptable salt thereof and that is used to administer the compound represented by Formula (I) to a patient at a dosage of 8 mg/kg or less per dose. Moreover, the radiosensitizing agent is used to administer the compound represented by Formula (I) to a patient at a dosage of 0.5 mg/kg or more and preferably 1 mg/kg or more per dose. The compound represented by Formula (I) is preferably administered to a patient at a dosage of more than 2 mg/kg, more preferably 3 mg/kg or more, and even more preferably 4 mg/kg or more per dose. Selecting such a dose makes it possible to obtain sufficient efficacy while reducing a dosage.

There is no particular limitation on the administration route of the radiosensitizing agent. Examples of the administration route include oral administration and parenteral administration. A suitable dosage form for oral administration is a solid dosage form, a semi-solid dosage form, a liquid dosage form, or a gaseous dosage form, and specific examples thereof include, but are not limited to, a tablet, a capsule, a powdered medicine, a granular medicine, a liquid medicine, a suspension, a syrup, an elixir, and an aerosol. Examples of a parenteral administration method include injection, dermal administration, rectal administration, and intraocular administration. Examples of an injection administration method include subcutaneous administration, intracutaneous administration, intravenous administration, and intramuscular administration.

In one embodiment, the radiosensitizing agent is intravenously administered from the viewpoint of obtaining higher efficacy. Moreover, it is preferable to slowly administer the radiosensitizing agent over 1 minute or longer from the viewpoint of suppressing local inflammation.

There is no particular limitation on a radiation treatment method. For example, the same radiation type, irradiation amount, and irradiation frequency as those employed in conventional radiation treatment can be employed. In an example of the radiation treatment method, medical radiation such as X rays, γ rays, electron rays, β rays, or corpuscular rays (e.g., π-mesons, neutrons, or other baryons) is applied over a period of 1 week to 6 months at a dosage of about 0.1 to 100 Gy (about 1 to 500 Gy in total) per dose.

On the other hand, in one embodiment, a dosage per dose is more than 2 Gy, preferably 3 Gy or more, and more preferably 4 Gy or more, in order to sufficiently obtain an effect of the radiosensitizing agent to improve the efficacy of radiation treatment. Moreover, the total dosage is preferably 10 Gy or more and more preferably 15 Gy or more. On the other hand, in one embodiment, a dosage per dose may be 20 Gy or less and is preferably 10 Gy or less, because the efficacy of radiation treatment is improved by the radiosensitizing agent. Furthermore, the total dosage may be 100 Gy or less and is preferably 50 Gy or less.

There is also no particular limitation on the irradiation method, and conformal irradiation, stereotactic irradiation in which a lesion of a malignant neoplasm is targeted by pinpoint irradiation, intensity modulated irradiation, or the like can be employed. Irradiation with small sealed radioactive sources, remote γ-ray irradiation, corpuscular-ray irradiation, or the like can also be employed as another method.

As described above, the radiosensitizing agent is administered to a patient when the patient undergoes radiation treatment. On the other hand, there is no particular limitation on specific timing at which the radiosensitizing agent is administered when the radiation treatment is performed. For example, as disclosed in International Publication No. WO2009/14101, the radiation treatment may be performed every 3 days while the radiosensitizing agent is administered every day. On the other hand, when the radiation treatment is repeated, the radiosensitizing agent may be administered just before each cycle of the radiation treatment.

In one embodiment, the administration of the radiosensitizing agent and the irradiation immediately following the administration are performed as a set, and this set is repeated. Such a set may be repeated at regular intervals. In this case, the radiosensitizing agent need not be administered on a day the irradiation is not performed. Higher efficacy can be obtained by administering a sufficient amount of the radiosensitizing agent just before the irradiation as described above. It should be noted that the term "the irradiation immediately following the administration of the radiosensitizing agent" refers to applying radiation within 3 hours after the administration of the radiosensitizing agent. Radiation is preferably applied within 1 hour, more preferably 30 minutes, after the administration of the radiosensitizing agent.

In one embodiment, the administration of the radiosensitizing agent and the irradiation immediately following the administration are performed as a set, and this set is repeated at a frequency of once or less a day. That is, this set may be performed once a day or once a week. The frequency of the repetition is preferably once or more a month, more preferably once or more every 2 weeks, and even more preferably once or more a week. Moreover, the set is preferably repeated 3 or more times, and more preferably 4 or more times. Higher efficacy can be obtained by repeating the administration as described above. On the other hand, the frequency of the repetition may be once or less every 2 days or once or less every 3 days. Moreover, the set is preferably repeated 50 or less times, and may be repeated 10 or less times or 6 or less times. With this embodiment, higher efficacy can be obtained while side effects of the radiation treatment are suppressed.

The other irradiation conditions and the other administration conditions of the radiosensitizing agent can be selected as appropriate by healthcare workers and other professionals depending on the type of radiation source, the irradiation method, the irradiated site, and the irradiation period; the type of radiosensitizing agent, the administration route, and the administration timing; the type of disease to be treated and the severity of the disease; the age, weight, health state, and case history of a patient to be treated; and the like.

Cancer in a patient can be treated by administering an effective amount of the radiosensitizing agent to a patient in need thereof and performing the radiation treatment on the patient as described above.

As a result of a toxicity test on dogs, the inventors of the present invention found that the toxicity of the radiosensitizing agent according to the present invention was reduced by setting a dose thereof to 8 mg/kg or less. That is, when the radiosensitizing agent according to the present invention was intravenously administered to dogs at a dose of 32 mg/kg every day for 2 weeks, red urine was observed in all of the six subjects, and when the dose was 16 mg/kg, red urine was also observed. Also, when the dose was 8 mg/kg, it was confirmed that local irritation occurred at the administration sites. In view of these findings as well, the dose of the radiosensitizing agent according to the present invention is preferably 8 mg/kg or less.

EXAMPLES

Example 1

A dog suffered from oral melanoma on the left upper jaw was subjected to radiation treatment combined with a radiosensitizing agent once a week (four times in total). A compound A was used as the radiosensitizing agent. The compound A is an α anomer compound (αSQAP C18:0) that includes $CO(CH_2)_{16}CH_3$ (stearoyl group: acyl residue from stearic acid) as $R^1$ in Formula (I).

One cycle of the radiation treatment was performed as follows. First, the compound A was intravenously administered at a dose of 8 mg/kg over 5 minutes. Then, the tumor was immediately irradiated with radiation (X rays, 6 MV) at a dose of 7.5 Gy.

It was confirmed that the tumor volume was reduced to 49% due to the 4 cycles of the radiation treatment combined with the radiosensitizing agent.

Example 2

A dog that had been suffered from nasal cavity adenocarcinoma was subjected to radiation treatment combined with a radiosensitizing agent once a day (four times in total) in order to treat nasal cavity adenocarcinoma recurring 2 years and 1 month after the tumor excision operation. The compound A described above was used as the radiosensitizing agent. One cycle of the radiation treatment was performed as follows. First, the compound A was intravenously administered at a dose of 8 mg/kg, and then the tumor was immediately irradiated with radiation (X rays, 6 MV) at a dose of 4.5 Gy.

Although the tumor size was not evaluated, the patient survived for 1 year and 4 months after the radiation treatment. It should be noted that the cause of death was gastric carcinoma.

Example 3

A cat suffered from lymphoma in the left nasal cavity was subjected to radiation treatment once a week (six times in total). In one cycle of the radiation treatment, radiation (X rays, 4 MV) was applied at a dose of 5.5 Gy. However, an effect of reducing the tumor size was not exhibited. On the contrary, an increase in tumor size was confirmed despite the radiation treatment, and swelling of the glabella region was observed.

Accordingly, after the above-mentioned radiation treatment, radiation treatment combined with a radiosensitizing agent was performed once a week (three times in total). The compound A described above was used as the radiosensitizing agent. One cycle of the radiation treatment was performed as follows. First, the compound A was intravenously administered at a dose of 4 mg/kg over 1 minute. The tumor was irradiated with radiation (X rays, 4 MV) at a dose of 4 Gy 15 minutes after the administration of the compound A.

Before the second cycle of the radiation treatment combined with the radiosensitizing agent, it was observed that the swelling of the glabella region was reduced, and thus the facial appearance recovered. Also, it was observed that the tumor that had infiltrated into the left nasal cavity and the eye orbit was significantly reduced in size even 1 month after the third cycle of the radiation treatment combined with the radiosensitizing agent, and the tumor volume was reduced to 10% of that prior to the start of the radiation treatment combined with the radiosensitizing agent.

Example 4

Twenty-two dogs suffered from nasal cavity adenocarcinoma were divided into a radiosensitizing-agent administration group (11 dogs) and a non-administration group (11 dogs), and a control test of radiation treatment combined with a radiosensitizing agent was performed.

The radiosensitizing-agent administration group was subjected to radiation treatment combined with a radiosensitizing agent once a week (six times in total). The compound A described above was used as the radiosensitizing agent. One cycle of the radiation treatment was performed as follows. First, the compound A was intravenously administered at a dose of 4 mg/kg over 1 minute. The tumor was irradiated with radiation (X rays, 4 MV) at a dose of 6 Gy 15 minutes after the administration of the compound A.

The radiosensitizing-agent non-administration group was subjected to radiation treatment that was not combined with a radiosensitizing agent once a week (six times in total). In one cycle of the radiation treatment, the tumor was irradiated with radiation (X rays, 4 MV) at a dose of 6 Gy.

As a result, in the radiosensitizing-agent administration group, the tumor volume was reduced to 30% on the average after the radiation treatment. Moreover, the effect of reducing the tumor size exhibited in the radiosensitizing-agent administration group was significantly higher than that in the non-administration group (P=0.0205).

Example 5

A cat suffered from recurrent oral squamous cell carcinoma was subjected to radiation treatment combined with a radiosensitizing agent three times in total. The compound A described above was used as the radiosensitizing agent. In one cycle of the radiation treatment, first, the compound A was intravenously administered at a dose of 1 mg/kg, and then the tumor was immediately irradiated with radiation (X rays, 4 MV). The total dosage of radiation was 21 Gy.

It was confirmed that the tumor was eliminated due to the radiation treatment combined with the radiosensitizing agent. It was confirmed that the state in which the tumor was eliminated was still maintained even 3 months after the end of the treatment.

Example 6

A cat suffered from squamous cell carcinoma on the left upper jaw was subjected to radiation treatment combined with a radiosensitizing agent five times in total. The compound A described above was used as the radiosensitizing agent. In one cycle of the radiation treatment, first, the compound A was intravenously administered at a dose of 2 to 4 mg/kg, and then the tumor was immediately irradiated with radiation (X rays, 6 MV). The total dosage of radiation was 32.5 Gy (7.5 Gy×3 and 5 Gy×2).

It was confirmed that the tumor on the left upper jaw was eliminated due to the radiation treatment combined with the radiosensitizing agent. It was confirmed that the state in which the tumor on the left upper jaw was eliminated was still maintained even 5 months after the end of the treatment.

It was confirmed from the results of the examples above that the radiation treatment combined with the radiosensitizing agent exhibited the significant effect of reducing the size of or eliminating cancer developed in the body of a patient.

The invention is not limited to the foregoing embodiments, and various variations/changes are possible within the spirit of the invention.

What is claimed is:

1. A method of treating cancer comprising repeating a set of administration of a compound represented by General Formula (I) or a pharmaceutically acceptable salt thereof to a patient, at a dosage such that 8 mg/kg or less of the compound represented by General Formula (I) is administered per dose, and irradiation to the patient immediately following the administration:

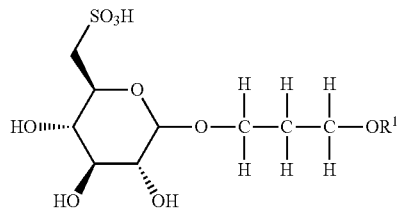

where $R^1$ is an acyl residue from fatty acid, wherein a total dosage of the irradiation on a cancer is 10 Gy or more, and wherein the patient is a dog or cat.

2. The method according to claim 1, comprising repeating the set at a frequency of once or less a day and once or more a month.

3. The method according to claim 1, wherein the cancer is melanoma or lymphoma.

4. The method according to claim 1, wherein the cancer is adenocarcinoma or squamous cell carcinoma.

5. The method according to claim 1, wherein the dosage is such that the 0.5 mg/kg or more of the compound represented by General Formula (I) is administered per dose.

6. The method according to claim 1, wherein $R^1$ is a stearoyl group.

7. The method according to claim 1, wherein repeating the set of the administration and the irradiation leads to reduce the size of the cancer or eliminate the cancer.

8. The method according to claim 1, wherein the total dosage of the irradiation on the cancer is 15 Gy or more.

9. The method according to claim 1, wherein the set of the administration and the irradiation is repeated once or more every 2 weeks and repeated 10 times or less.

* * * * *